United States Patent
Meurer

(10) Patent No.: US 10,421,619 B2
(45) Date of Patent: Sep. 24, 2019

(54) METHOD FOR CHANGING THE ORIENTATION OF PACKAGES IN A TRANSPORT SYSTEM

(71) Applicant: Dematic GmbH, Heusenstamm (DE)

(72) Inventor: Hans Christoph Meurer, Framersheim (DE)

(73) Assignee: Dematic GmbH, Heusenstamm (DE)

( * ) Notice: Subject to any disclaimer, the term of this patent is extended or adjusted under 35 U.S.C. 154(b) by 0 days.

(21) Appl. No.: 15/768,234

(22) PCT Filed: May 31, 2017

(86) PCT No.: PCT/EP2017/063218
§ 371 (c)(1),
(2) Date: Apr. 13, 2018

(87) PCT Pub. No.: WO2017/220301
PCT Pub. Date: Dec. 28, 2017

(65) Prior Publication Data
US 2018/0273307 A1 Sep. 27, 2018

(30) Foreign Application Priority Data

Jun. 23, 2016 (DE) .......................... 10 2016 111 504

(51) Int. Cl.
*B65G 47/00* (2006.01)
*B65G 47/24* (2006.01)
(Continued)

(52) U.S. Cl.
CPC ......... *B65G 47/244* (2013.01); *B65G 1/0485* (2013.01); *B65G 47/53* (2013.01)

(58) Field of Classification Search
None
See application file for complete search history.

(56) References Cited

U.S. PATENT DOCUMENTS 4,995,157 A * 2/1991 Hall ..................... H05K 13/022
198/385
6,139,240 A * 10/2000 Ando .................. B65G 47/844
414/267
(Continued)

FOREIGN PATENT DOCUMENTS

DE         19853685 A1    5/1999
DE     102004046176 A1    4/2006
(Continued)

OTHER PUBLICATIONS

International Search Report and Written Opinion of the International Searching Authority from corresponding Patent Cooperation Treaty (PCT) Application No. PCT/EP2017/063218, indicated completed on Aug. 28, 2017.
(Continued)

*Primary Examiner* — Kavel Singh
(74) *Attorney, Agent, or Firm* — Gardner, Linn, Burkhart & Ondersma LLP

(57) ABSTRACT

A method for placing packets having a length different from the width into and out of storage in a storage rack in which the packet is oriented extending longitudinally and transversely as selected and the orientation can be changed between a distribution path and it being placed into or out of storage. The orientation of the packet can be changed by 90 degrees between a distribution path and the storage rack, for which purpose in each case two incoming paths and/or outgoing paths are disposed in a crossing arrangement between the distribution path and the storage rack, wherein via each incoming path and/or outgoing path at least two storage rack aisles can be reached or emptied, and a 90 degree deflector is disposed at the crossing point in order to change the incoming or outgoing path as selected.

11 Claims, 3 Drawing Sheets

(51) Int. Cl.
*B65G 47/52* (2006.01)
*B65G 47/244* (2006.01)
*B65G 47/53* (2006.01)
*B65G 1/04* (2006.01)

(56) References Cited

U.S. PATENT DOCUMENTS

| | | | |
|---|---|---|---|
| 9,457,966 B2* | 10/2016 | Issing | ............... B65G 1/1378 |
| 2014/0291114 A1 | 10/2014 | Artz et al. | |
| 2015/0336741 A1 | 11/2015 | Ahammer | |

FOREIGN PATENT DOCUMENTS

| | | |
|---|---|---|
| DE | 102009032406 A1 | 1/2011 |
| DE | 102011005402 A1 | 9/2012 |
| EP | 1574459 A1 | 9/2005 |
| JP | 2000247406 A | 9/2000 |
| JP | 2000255763 A | 9/2000 |

OTHER PUBLICATIONS

Preliminary Report on Patentability of the International Searching Authority in English from corresponding Patent Cooperation Treaty (PCT) Application No. PCT/EP2017/063218, completed Dec. 25, 2018 (German language version previously filed on Apr. 13, 2018).

\* cited by examiner

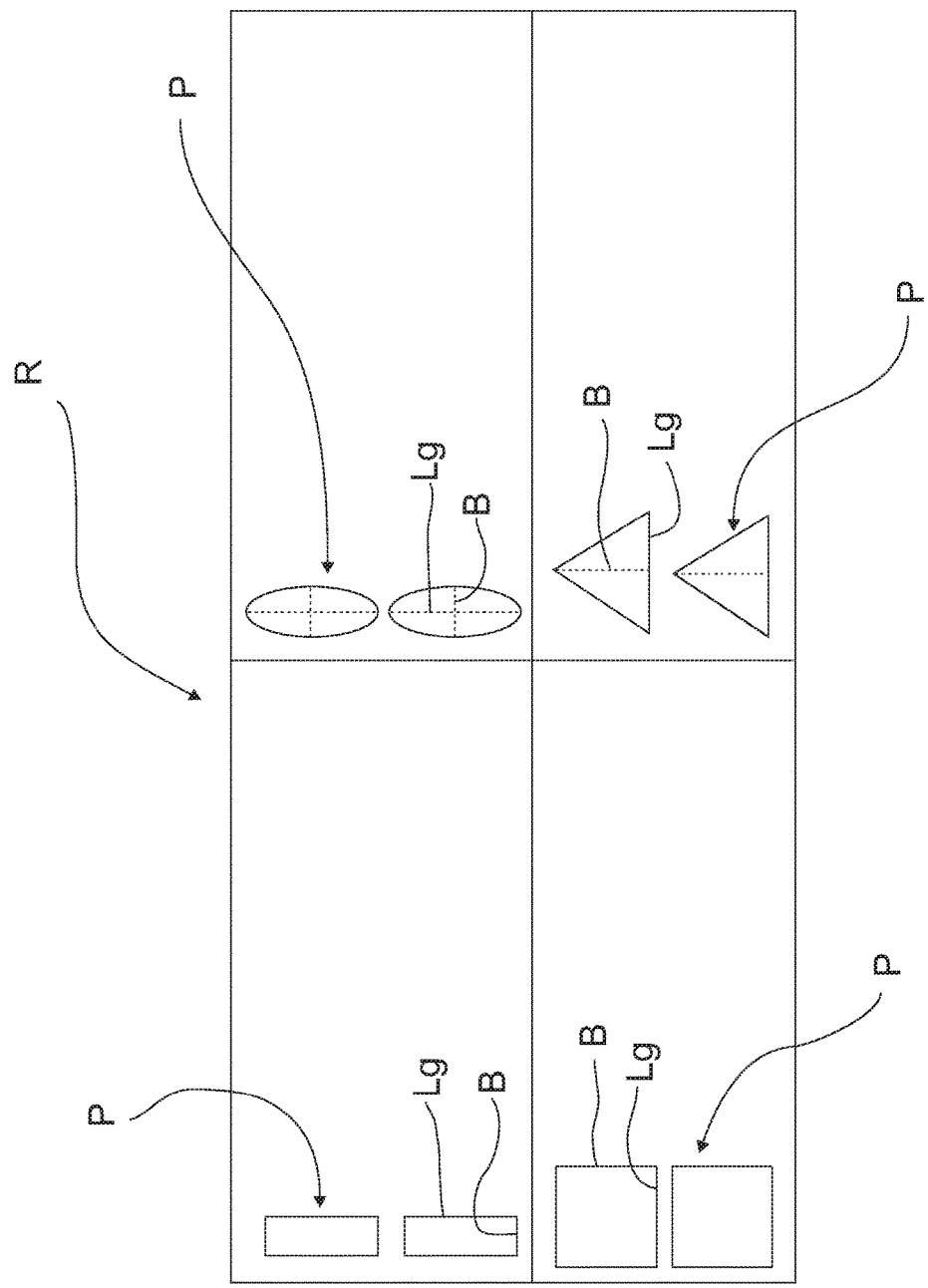

METHOD FOR CHANGING THE ORIENTATION OF PACKAGES IN A TRANSPORT SYSTEM

CROSS REFERENCE TO RELATED APPLICATIONS

The present patent application claims the priority benefits of International Patent Application No. PCT/EP2017/063218, filed May 31, 2017, and claims benefit of German patent application DE 10 2016 111504.5, filed Jun. 23, 2016, which are hereby incorporated by reference.

BACKGROUND OF THE INVENTION

The invention relates to a method for placing into storage and out of storage packets having a length of the packet base which is different from a width thereof in a storage rack or from a storage rack, in which the packet is oriented extending longitudinally and transversely as selected, and wherein the orientation of the packet can be changed between a distribution path and it being placed into storage in the storage rack or between being placed out of storage from the storage rack and a distribution path.

US2014/0291114 A1 discloses a conveying system for changing the orientation of goods or packets on a conveying path, which includes eleven conveying elements disposed to form a conveying loop. These conveying elements form a main conveying direction in an "L-shape" and a connection of the two limbs of the "L" by two further conveying paths connected at an angle of about 90 degrees. In this conveying loop, a packet is transported from an entry conveyor via a further conveyor to a first transfer point. At this transfer point, i.e. transfer conveyor, the packet is conveyed further either with an original orientation relative to the conveying direction or it is turned by a 90 degree angle to achieve a change in orientation via the transfer conveyor. After turning via the first transfer conveyor the packet moves onto a further conveyor to a second transfer conveyor. By means of this second transfer conveyor, the conveying direction is again changed by 90 degrees in order to supply the packet to the main conveying path but at an orientation changed by 90 degrees compared with the start of the conveying loop. In order for the packet finally to return to the main conveying path, its conveying direction is again changed via a transfer conveyor. Therefore, in this case three transfer points are required in order to change the orientation of a packet.

In the field of storage technology, increasing demands are being made on the access times of stored goods where there is an increasing need for larger storage surfaces and a higher throughput. Thus, goods are increasingly placed into storage as packets to be accessed individually instead of on pallets. In particular in the clothing industry and in the food trade these conveyed goods, i.e. individual packets, have different dimensions. In order to achieve a maximum filling level of the store, it can be advantageous to have a longitudinally or transversely oriented storage arrangement depending on the dimensions of the base surface, i.e. of the packet base. In this case, the problem arises of individually orienting each packet on the way from the distribution path to the storage aisle longitudinally or transversely with respect to the conveying direction or subsequent direction of placing goods into storage. The word 'packet' is used to represent all types of transported goods and includes individual articles, transport containers, trays, bundles, etc.

SUMMARY OF THE INVENTION

In accordance with the invention, in a method for placing into storage and out of storage packets having a length different from the width in a storage rack or from a storage rack, in which the packet is oriented extending longitudinally and transversely as selected and the orientation can be changed between a distribution path and it being placed into storage in the storage rack or between being placed out of storage from the storage rack and the distribution path, wherein the distribution path conveys packets to place them into storage or discharges them for placement out of storage and comprises at least two discharge apparatuses which extend in the direction of a storage rack in a respective incoming path, wherein the conveying direction is the same as the direction for placing packets into storage and the incoming path can also be an outgoing path, the discharge apparatuses can also be introducing apparatuses and the direction for placement into storage can also be the direction for placement out of storage, the filling level is increased in that, between the distribution path and the storage rack, the orientation of the packet is changed by 90 degrees, for which purpose in each case two incoming paths are disposed in a crossing arrangement between the distribution path and the storage rack, wherein via each incoming path at least two storage rack aisles can be reached, and a 90 degree deflector is disposed at the crossing point in order to change the incoming path as selected.

Such a change in the packet orientation has the advantage that packets can be placed into storage in a space-saving manner since the most favourable packet orientation in each case can be selected. Thus, for example, racks can be filled exclusively with packets in an orientation directed longitudinally or transversely with respect to the conveying direction, but at the same time mixed racks with both orientations are also possible. This flexible placement of goods into storage makes it possible to optimally exploit the space available in each case. A further advantage of the selectability of the packet orientation is a possible narrowing of the storage rack aisle since rack serving apparatuses with narrower dimensions can be used to place packets into and out of storage with optimised orientation. By using a 90 degree deflector it is also possible to save on further conveying technology in order to change the orientation.

Therefore, the packets can be placed into storage in their conveying orientation. In the case of packets with a packet base similar to a rectangle or square, the length and width are in each case the sides—forming an angle—of the rectangle or square defining the packet base. In the case of a packet base similar to a triangle, these are the hypotenuse and the height of the triangle at a right angle to the hypotenuse defining the packet base. In the case of a packet base similar to an ellipse, the length and width are the major and minor axes of the ellipse defining the packet base.

In accordance with the invention, packets with packet bases which can be defined by a non-rotationally symmetrical shape, can be placed into storage in a more space-saving manner by changing their orientation by 90 degrees.

The structure of the storage system can be formed by a high-level rack store which includes a plurality of shelved racks arranged in pairs and spaced apart by storage rack aisles, in combination with a conveying system which consists of a distribution path and a plurality of incoming paths. Thus, the distribution path outside the storage racks of the high-level rack store extends through the store and, at a number of locations, comprises discharge apparatuses from the distribution path into the incoming paths in the direction of the storage racks. The incoming paths can cross at a number of points before they end at the lifts used for placing goods into storage in the storage racks. One crossing per incoming path is preferred. At each crossing point there is a 90 degree deflector for changing the packet orientation. The storage racks of the high-level rack store can be e.g. shelved racks. By means of lifts for placing goods into storage and buffer stations, rectangular shelves of the racks can be reached by rack serving apparatuses or shuttle vehicles.

In a constructionally simplifying and space-saving manner, provision is made that, via each discharge apparatus of the distribution path and of the following incoming path, at least two storage rack aisles are accessible. This makes it possible, for each packet at a discharge apparatus, to select between two storage rack aisles and therefore between four racks.

In addition to the ability to sort the packets by selecting between two storage rack aisles instead of only one, a further advantage of the crossed arrangement of the incoming paths is the saving on a further conveying element. Thus, for implementation of a double option for placing goods into storage in two rack aisles via only one discharge apparatus a further conveying element would be required in order to connect one discharge apparatus to a second storage rack aisle. Therefore, in accordance with the invention, more functionality of the conveying system is provided while saving on further conveying technology. Furthermore, compared with the prior art the invention requires only two transfer conveying elements, i.e. deflectors, and no additional conveying elements for changing the packet orientation.

With a conveying system operating at high performance (e.g. 10000 packets per hour), by reason of the high throughput and the resulting risk of bottlenecks, it is not possible for the packets from the main conveying path to be placed out of storage by transverse or corner discharge, and therefore no change in orientation by the discharge apparatus is possible. This problem is solved in accordance with the invention by the crosswise arrangement of the incoming paths since in this way, even with the conveying system operating at high performance, packets can be transferred without additional conveying technology, e.g. from longitudinal transportation, by a change in orientation, into the preferred direction for placement into storage. Longitudinal placement into storage, 'short edge leading', is preferred in the field.

Moreover, provision is made in accordance with the invention that each storage rack can be filled with packets oriented transversely and longitudinally. In the case of narrow lifters and large packets, so-called 'long edge leading' placement into storage is preferred. This means in particular that storage racks can be filled exclusively with transversely oriented packets or alternatively also exclusively with longitudinally oriented packets. Mixed racks with packets in both orientations are likewise possible. As a result, the storage racks of the high-level rack store can be optimised with respect to the locally prevailing conditions in terms of space, and by means of an orientation of the packets which is favourable for a rack serving apparatus or shuttle vehicle it may even be possible for the storage rack aisles to be narrowed because rack serving apparatuses with a narrower periphery can be used to place goods into and out of storage. This leads to a generally space-saving arrangement of the racks and permits use of larger storage surfaces.

It is also advantageous that in the case of e.g. very large packets and technology for placement into storage—i.e. lifts, lifters, rack serving apparatuses and the like—with limited dimensions, the packets can be rotated into an advantageous orientation. In this way, e.g. in the case of a very wide but elongate packet which exceeds the width of the equipment for placement into storage, the orientation can be changed so that the packet can be received.

A further space-saving advantage is that the incoming paths between the discharge apparatuses and crossing point can be used as goods buffers between the distribution path and storage rack. In the case of an incoming path which is being used to full capacity or a storage rack which is being used to full capacity, goods can be diverted via the deflector onto an alternative incoming path or an alternative storage rack aisle. This means that packets can be buffered on the incoming path and, in the case where an incoming path is being used to full capacity, can be diverted onto a second incoming path. In this case, by means of appropriate positions of the deflector it is possible to intervene in the distribution of goods or packets in that packets can be flexibly diverted, while taking account of a change in orientation, from a full incoming path to a less full incoming path. It is also the case here that no additional conveying technology is required for the provision of a buffer path.

The invention is applied to placement into storage in storage rack aisles but is also provided for use in placement out of storage from the storage rack aisles.

As already mentioned above, the invention can also be applied to placement of packets out of storage from a storage rack. In this case, the transport path of a packet runs precisely in reverse. The packet is removed from storage from the storage rack by means of e.g. a rack serving apparatus and is transferred to a goods life. This transports the packet onto an outgoing path which is disposed crosswise with an adjacent outgoing path. In an analogous manner to the description of the placement of packets into storage, a deflector is located at the crossing point, by means of which the packet can change its outgoing path and orientation for placement out of storage. The outgoing path then leads via an introducing apparatus onto the main conveyor path of the conveying system.

An exemplified embodiment of the invention will be explained in greater detail hereinafter with reference to the drawings.

BRIEF DESCRIPTION OF THE DRAWINGS

FIG. 3 shows a plan view of possible forms of the packets in the storage racks.

DESCRIPTION OF THE PREFERRED EMBODIMENTS

Figure 1:
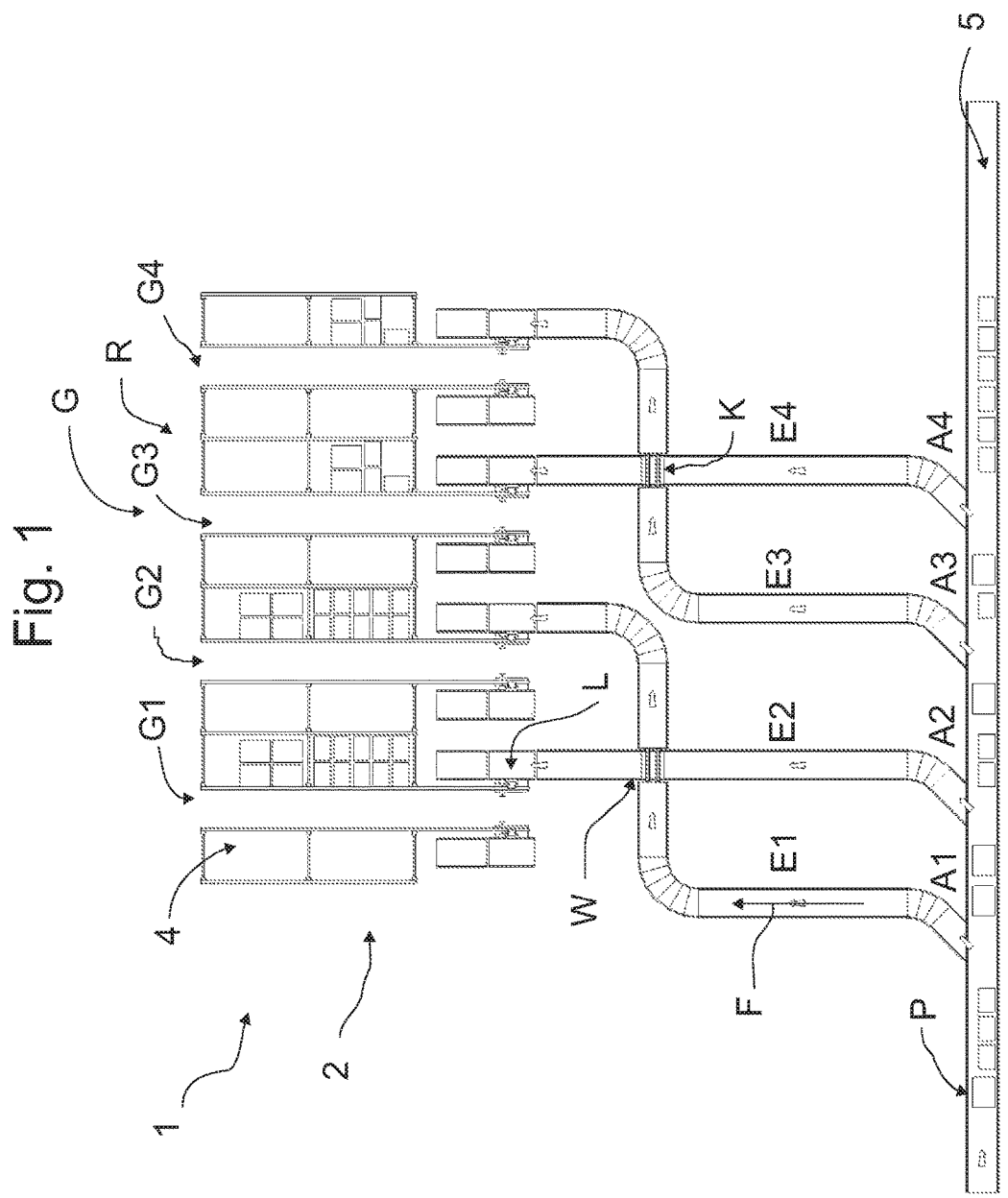
FIG. 1 shows a schematic plan view of a conveying system and a high-level rack store for orienting and placing packets into storage.

FIG. 1 shows a plan view of a conveying system 1 for placing packets P into storage in a high-level rack store 2. The high-level rack store 2 comprises a plurality of storage racks R which form the storage rack aisles G1-G4, and a plurality of storage rack levels 3 with a plurality of rectangular shelves 4 for the storage of packets P. The conveying system 1 contains a distribution path 5 which is connected via a plurality of discharge apparatuses A1-A4 and subsequent incoming paths E1-E4 to the storage rack aisles G1-G4 of the high-level rack store 2.

In this case, the distribution path 5 outside the storage racks R transports packets P through a storage area. The distribution path 5 comprises a plurality of discharge apparatuses A1-A4 in the direction of the high-level rack store 2.

These discharge apparatuses A1-A4 connect the distribution paths 5 to the incoming paths E which lead from the respective discharge apparatus to the storage racks R. Between the distribution path 5 and the storage racks R, the incoming paths E cross each other at a crossing point K.

Goods or packets P are placed into storage in the high-level rack store 2 by the following method. The packets P are moved along the distribution path 5 which consists of one or a plurality of conveying elements, e.g. roller conveyors or belt conveyors.

The discharge apparatuses A1-A4 lead laterally away from the distribution path 5 in the direction of the high-level rack store 2. The discharge apparatuses A1-A4 are disposed on the same side of the distribution path as the high-level rack store 2 and likewise consist of a plurality of conveying elements which can be arranged as a straight path or as a bend.

The first discharge apparatus A1 and the second discharge apparatus A3 are arranged in an "S-shape" and therefore cross the second and fourth discharge apparatuses A2 and A3 respectively before they terminate at the second storage rack aisle G2 and at the fourth storage rack aisle G4 respectively. Therefore, the distribution path 5 is directly connected by the four discharge apparatuses A1, A2, A3 and A4 to the four storage rack aisles G2, G1, G4 and G3 in this sequence.

The conveying system can naturally also comprise a smaller or larger number of discharge apparatuses A and storage rack aisles G, e.g. at least two of each or even six or eight. However, every two of the discharge apparatuses A always cross each other at at least one crossing point K. Thus, the crossing point K is provided with a respective deflector W. The packets P are conveyed from the distribution path 5 into one of the discharge apparatuses A. The packets P are first conveyed to one of the deflectors W via the discharge apparatuses A.

At the deflector W, the packets P can maintain their conveying direction F or they are displaced transversely with respect to the conveying direction F. After passing the deflector W, the packets P therefore follow either the same incoming path E, e.g. E1, onto which they have been discharged from the respective discharge apparatus A1, A2, A3 or A4, or they change via the deflector W to an adjacent incoming path, e.g. E2, which then supplies them to the respective storage rack aisle, e.g. G2 or G1.

The transverse displacement at the deflector W thus leads to a change in the incoming path E and to a change in the orientation of a packet by 90 degrees.

By means of the deflector it is thus possible to choose for each packet from a discharge apparatus A1-A4 between longitudinal orientation and transverse orientation, between two incoming paths, e.g. E1 and E2 or E3 and E4, and two storage rack aisles, e.g. G2 and G1 or G4 and G3. This arrangement of the discharge apparatuses permits sorting of the packets while at the same time saving on additional conveying technology. In turn, this permits a more space-saving arrangement while at the same time achieving a high throughput of goods and the use of larger storage surfaces.

Figure 2:
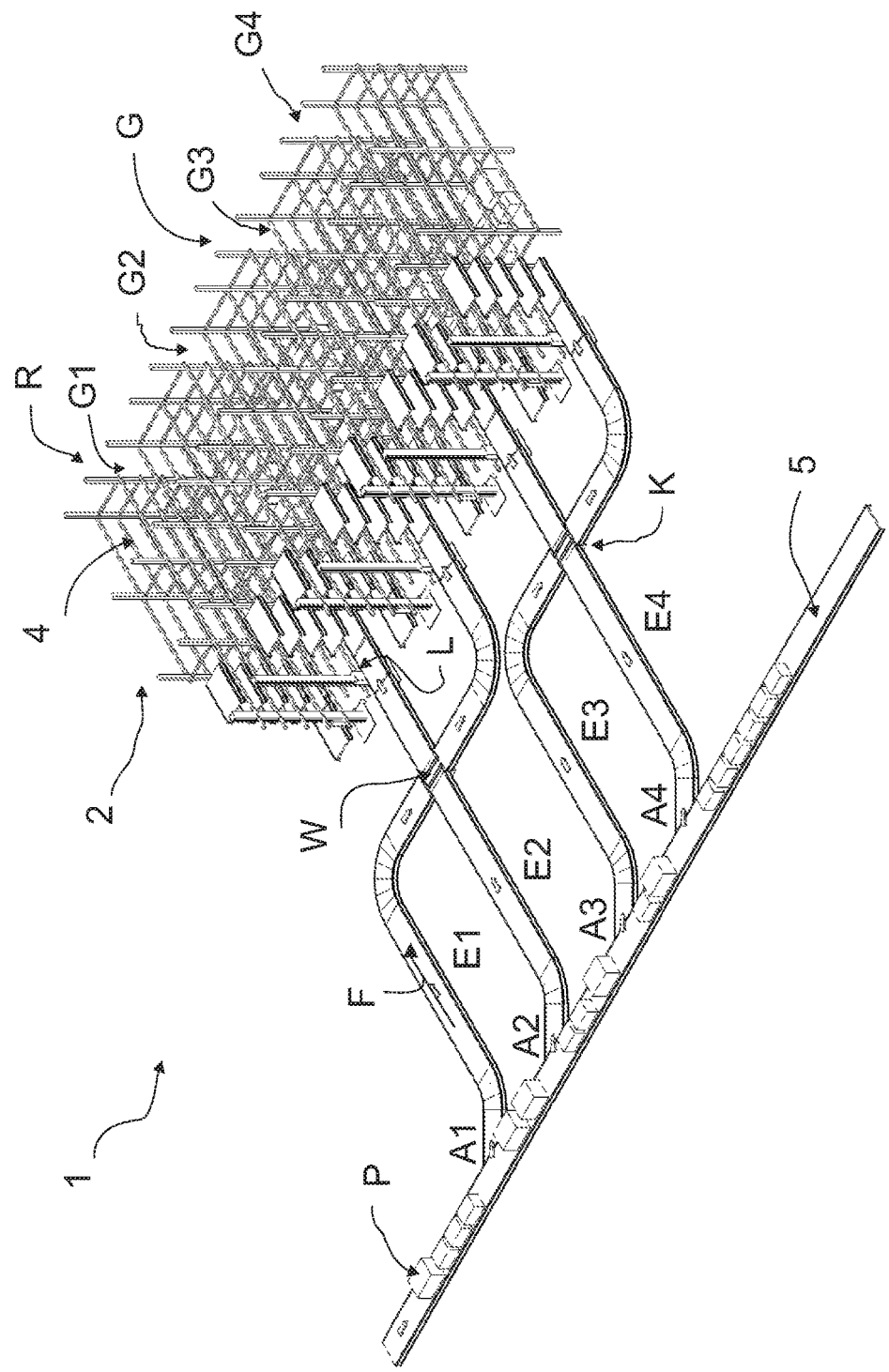
FIG. 2 shows a perspective view of the conveying system and of the high-level rack store of FIG. 1

FIG. 2 shows a perspective plan view of the conveying system 1 and the high-level rack store 2. After a packet P has passed the deflector W and has been placed in the desired transverse or longitudinal orientation or direction for placement into storage, it is conveyed to a lift L for placing goods into storage.

A lift L for placing goods into storage is located upstream of each storage rack R and is arranged quasi as an extension of a rack side. The lift L for placing goods into storage travels between the individual storage rack levels 3 and distributes the goods to the storage rack levels 3 of the high-level rack store 2. At that location they are picked up by rack serving apparatuses or shuttle vehicles and placed into storage in compartments of the shelved rack store. In this case, the conveying direction in which a packet P arrives at the lift L for placing goods into storage is the same as the direction for placing goods into storage. This means that within the high-level rack store a further change in packet orientation is not necessary.

Therefore, each storage aisle G1-G4 can be filled with packets P in both orientations, longitudinal or transverse orientation.

By way of example, FIG. 3 shows possible shapes of the packets P in the storage racks R. In the case of packets with a packet base similar to a rectangle or square, the length L and width B are in each case the sides—forming an angle—of the rectangle or square defining the packet base. In the case of a packet base similar to a triangle, these are the hypotenuse and the height of the triangle at a right angle to the hypotenuse defining the packet base. In the case of a packet base similar to an ellipse, the length and width are the major and minor axes of the ellipse defining the packet base. Apart from these shapes, packets with a rotationally symmetrical basic shape can also naturally be placed into storage in a rack store R. In this case, however, the change in packet orientation by the deflector W is not advantageous for space-saving placement of goods into storage. In the packet shapes illustrated in FIG. 3 and all other shapes which have a length L different from the width B, a change in orientation can be advantageous for the placement of goods into storage.

This leads to a space-saving arrangement of the goods since the packet orientation most favourable in achieving the maximum filling level of the rack can be selected. This can result in the further advantage of narrowing the storage rack aisle since a rack serving apparatus with a narrower design can be used for removal of goods from the packing-optimised racks.

The invention claimed is:

1. A method for placing into storage and out of storage packets having a length different from a width in a storage rack store having a plurality of storage racks separated by storage rack aisles, in which the packet is oriented extending longitudinally and transversely as selected and the orientation of the packet can be changed between a distribution path and it being placed into storage in the storage rack or between being placed out of storage from the storage rack and the distribution path, said method comprising:
  conveying packets along the distribution path during placement into storage, wherein the distribution path comprises at least two discharge apparatuses which extend in the direction of the storage rack store in separate respective incoming paths disposed between the distribution path and the storage rack store, wherein packets are conveyed along the incoming paths for placement into storage, and wherein the conveying direction is the same as the direction for placing packets into storage, and/or
  discharging packets along the distribution path during placement out of storage, wherein during placement out of storage the incoming paths comprise outgoing paths disposed between the distribution path and the storage rack store, wherein packets are conveyed along the outgoing paths for placement out of storage and the at least two discharge apparatuses comprise at least two introduction apparatuses which are supplied from a respective outgoing path from the direction of the storage rack store, and wherein the conveying direction is the same as the direction for placing packets out of storage; and changing the orientation of packets by 90 degrees between the distribution path and the storage rack store, for which purpose in each case two incoming paths and/or outgoing paths intersect each other and are joined at a crossing point between the distribution path and the storage rack store whereby packets may be selectively transferred from one incoming path to the other incoming path during placement into storage and/or packets may be selectively transferred from one outgoing path to the other outgoing path during placement out of storage such that via each incoming path and/or each outgoing path at least two storage rack aisles can be reached or emptied, and a 90 degree deflector is disposed at the crossing point in order to change the incoming path or outgoing path as selected.

2. The method as claimed in claim 1, wherein mutually adjacent incoming paths or outgoing paths intersect each other.

3. The method as claimed in claim 2, wherein each storage rack can receive packets in a transverse and longitudinal orientation.

4. The method as claimed in claim 3, further comprising buffering goods on the incoming paths or outgoing paths between the distribution path and the respective deflector.

5. The method as claimed in claim 1, wherein each storage rack can receive packets in a transverse and longitudinal orientation.

6. The method as claimed in claim 1, further comprising buffering goods on the incoming paths or outgoing paths between the distribution path and the respective deflector.

7. A conveying system for conveying packets having a length that is different from a width into and/or out of a storage rack store having a plurality of storage racks separated by rack aisles comprising:

a distribution path conveyor along which packets are conveyed into and/or out of a storage rack store, wherein said distribution path conveyor comprises at least two discharge conveyor apparatuses which lead into respective incoming paths extending in the direction of the storage rack store in which the conveying direction is the same as the direction for placing packets into storage, and/or said distribution path conveyor comprises at least two introduction conveyor apparatuses which are supplied from respective outgoing paths from the direction of the storage rack store where the conveying direction is the same as the direction for placing packets out of storage;

wherein the two incoming paths intersect each other and are joined at a crossing point between the distribution path and the storage rack store, and wherein a 90 degree deflector is disposed at the crossing point in order to transfer a packet from one incoming path to the other incoming path as selected such that via each incoming path at least two storage rack aisles can be reached; and wherein the two outgoing paths intersect each other and are joined at a crossing point between the distribution path and the storage rack store, and wherein a 90 degree deflector is disposed at the crossing point in order to transfer a packet from one incoming path to the other incoming path as selected such that via each outgoing path at least two storage rack aisles can be reached.

8. The conveying system of claim 7, wherein mutually adjacent incoming paths intersect each other and/or mutually adjacent outgoing paths intersect each other.

9. The conveying system of claim 8, wherein each storage rack can receive packets in a transverse and longitudinal orientation.

10. The conveying system of claim 7, wherein the incoming paths comprise goods buffers between the distribution path conveyor and the deflector and/or the outgoing paths comprise goods buffers between the distribution path conveyor and the deflector.

11. The conveying system of claim 7, wherein each storage rack can receive packets in a transverse and longitudinal orientation.

* * * * *